United States Patent [19]

Hara et al.

[11] Patent Number: 4,919,328
[45] Date of Patent: Apr. 24, 1990

[54] AUTOMOBILE AIR CONDITIONING SYSTEM

[75] Inventors: Junichiro Hara; Yoshiyuki Ogihara, both of Yokohama; Akira Mochizuki, Kanagawa, all of Japan

[73] Assignee: Nissan Motor Co., Ltd., Japan

[21] Appl. No.: 322,989

[22] Filed: Mar. 14, 1989

[30] Foreign Application Priority Data

Mar. 22, 1988 [JP] Japan .................................. 63-67620

[51] Int. Cl.$^5$ .............................................. F24F 7/00
[52] U.S. Cl. .................................... 236/49.3; 98/2.01; 236/91 C
[58] Field of Search ................................ 98/40.25, 2.01; 236/49.3, 91 C; 165/43

[56] References Cited

U.S. PATENT DOCUMENTS

| | | | |
|---|---|---|---|
| 4,571,950 | 2/1986 | Nariai et al. ........................ | 236/49.3 |
| 4,602,675 | 7/1986 | Kobayashi ........................ | 165/43 X |

FOREIGN PATENT DOCUMENTS

| | | | |
|---|---|---|---|
| 56-86814 | 7/1981 | Japan . | |
| 0017559 | 1/1987 | Japan .................................. | 236/49.3 |
| 62-47727 | 10/1987 | Japan . | |

OTHER PUBLICATIONS

Rikogakusha, "Thermophsicology", pp. 33-40, 1981.

*Primary Examiner*—William E. Wayner
*Attorney, Agent, or Firm*—Leydig, Voit & Mayer

[57] ABSTRACT

An air conditioning system for an automotive vehicle includes a duct through which conditioned air is directed into a compartment for passengers. A control device is associated with the duct for operating in a first mode discharging the conditioned air in the form of concentrated currents toward the passengers, in a second mode discharging the conditioned air in the form of diffused currents toward the passengers, and in a third mode in which switching is performed between the first and second modes at variable time intervals. One of the first, second and third modes is selected according to sensed values of compartment temperature and insolation intensity.

8 Claims, 5 Drawing Sheets

AUTOMOBILE AIR CONDITIONING SYSTEM

BACKGROUND OF THE INVENTION

This invention relates to an automobile air conditioning system including a duct through which conditioned air is directed into a vehicle passenger compartment.

Automotive air conditioning systems have sometimes utilized an air cooling heat exchanger, formed by an evaporator, and an air heating heat exchanger, heated by engine coolant, for reheating the chilled air. These heat exchangers are disposed in series in a duct having a movable air directing valve disposed therein for directing a variable proportion of the chilled air across the heater to control the final temperature of conditioned air introduced into the passenger compartment.

It has been proposed to provide the passengers with a more pleasant sensation by introducing the conditioned air in the form of continuous currents toward the passengers when a great difference exists between the sensed and desired values of compartment temperature and in the form of intermittent currents toward the passengers when the sensed compartment temperature comes closer to the desired value. However, such a proposal has proven insufficiently comfortable. This is stems from the fact that these mode changes are made without regard to the insolation intensity the intensity of incident sunlight on which the effective temperature is greatly dependent.

SUMMARY OF THE INVENTION

Therefore, it is a main object of the invention to provide an improved automobile air conditioning system which can produce conditioned air currents in a manner to provide more comfortable sensations to the passengers.

An automotive air conditioning system according to the present invention includes a duct through which tempered air is directed into a compartment for passengers. The system comprises a control device associated with the duct for operating in a first mode for discharging the conditioned air in the form of concentrated currents toward the passengers, in a second mode for discharging the conditioned air in the form of diffused currents toward the passengers, and in a third mode for changing the first and second modes at variable time intervals. The system also comprises means sensitive to a temperature in the passenger compartment for producing a first sensor signal indicative of a sensed value of compartment temperature, means sensitive to the insolation intensity for producing a second sensor signal indicative of a sensed value of insolation intensity, and a control unit responsive to the first and second sensor signals for operating the control device in one of the first, second and third modes.

BRIEF DESCRIPTION OF THE DRAWINGS

This invention will be described in greater detail by reference to the following description in connection with the accompanying drawings, in which.

DESCRIPTION OF THE PREFERRED EMBODIMENTS

Figure 1:
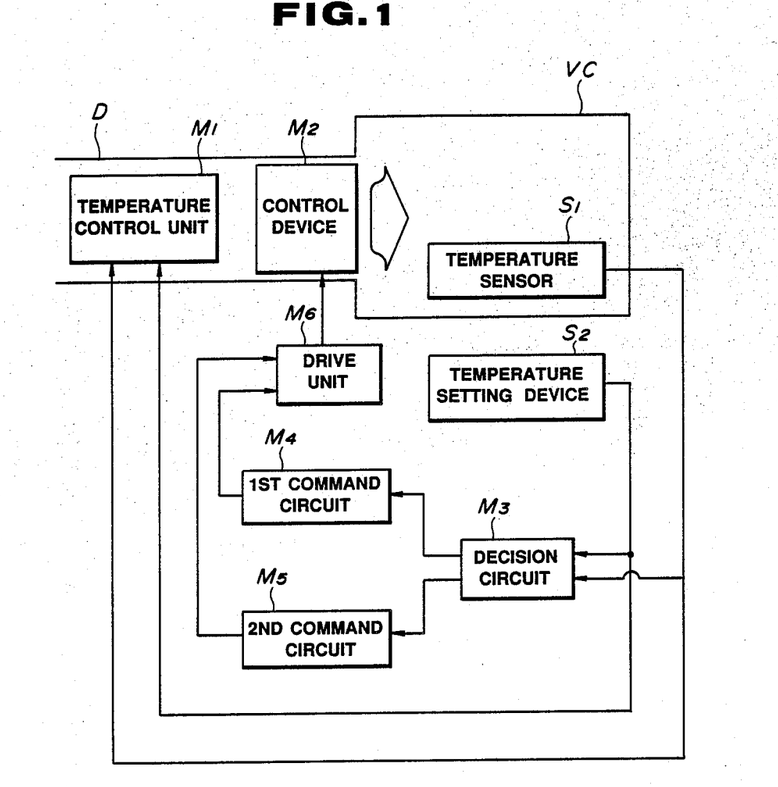
FIG. 1 is a schematic block diagram showing a conventional air conditioning system.

Prior to a description of the preferred embodiment of the present invention, the prior art air conditioning system of FIG. 1 will be briefly described in order to specifically point out the difficulties encountered in its use.

FIG. 1 shows a conventional air conditioning system as disclosed, for example, in Japanese Patent Publication No. 62-47727. The conventional system includes a duct D through which air is directed into the passenger compartment VC, an air temperature control unit M1, and a control device M2. A sensor S1 is provided on a position suitable for sensing the temperature in the passenger compartment VC. The sensor S1 provides a sensor signal indicative of a sensed compartment temperature to a decision circuit M3 and also to the temperature control unit M1. A setting device S2 is disposed in a position convenient for the passenger to set a desired temperature in the passenger compartment. The setting device S2 provides a setting signal indicative of a desired value for passenger compartment temperature to the decision circuit M3 and also to the temperature control unit M1. The control unit M1 calculates the difference between the sensed and desired values of passenger compartment temperature and controls the final temperature of the conditioned air entering the passenger compartment according to the calculated difference.

The decision circuit M3 calculates the difference between the sensed and desired values of passenger compartment temperature and produces a first control signal when the calculated difference is less than a predetermined value and a second control signal when the calculated difference exceeds the predetermined value. The first control signal is output from the decision circuit M3 to a first command circuit M4 which thereby produces a first command signal causing a drive unit M6 to operate the control device M2 in a first mode sending continuous currents of conditioned air toward the passengers seated on the vehicle front seats so as to impart a comfortable sensation to the passengers. The second control signal is output from the decision circuit M3 to a second command circuit M5 which thereby produces a second command signal causing the drive unit M6 to operate the control device M2 in a second mode sending intermittent currents of conditioned air toward the passengers seated on the vehicle front seats so as to prevent the passengers from becoming cold.

WIth the conventional air conditioning system, the conditioned air is introduced in the form of continuous currents directed to the passengers when the difference between the sensed and desired values of compartment temperature is greater than the predetermined value. In the presence of some degrees of insolation, the continuous conditioned air currents will impart a comfortable sensation to the passengers. When the insolation is weak, however, the passengers will feel uncomfortably cold. This stems from the fact that the human perspiration is greatly dependent on the influence of the existing insolation intensity.

It is known from the publication entitled "Thermophysiology", published in 1981 by Rikogakusha Co. that the mean radiant temperature Tr (°C.), which is substantially the same as effective human temperature taking into account the influence of the existing radiant heat, is given by the formula:

$$Tr = Tg + 2.37 \sqrt{v} (Tg - Ta)$$

where Tg is the temperature (°C.) measured by a globe thermometer having a thermometer placed in a black-painted copper globe with a 15 cm diameter for taking into account the influence of the existing radiant heat, Ta is the environmental temperature (°C.) measured by a dry bulb thermometer under a condition unaffected by the influence of the existing aerial current, and v is the velocity (m/s) of the wind. Therefore, a comfortable sensation may be to the passengers by controlling the air conditioning system according to the average radiation temperature Tr.

It was found through our experiments that the average radiation temperature Tr is 3 to 5° C. higher than the environmental temperature Ta on summer days. This means that the conventional air conditioning system is controlled according to the environmental temperature Ta which is 3° to 5° C. higher than the average radiation temperature Tr on summer days. As a result, the passengers will feel uncomfortably cold particularly when the isolation is weak.

Figure 2:
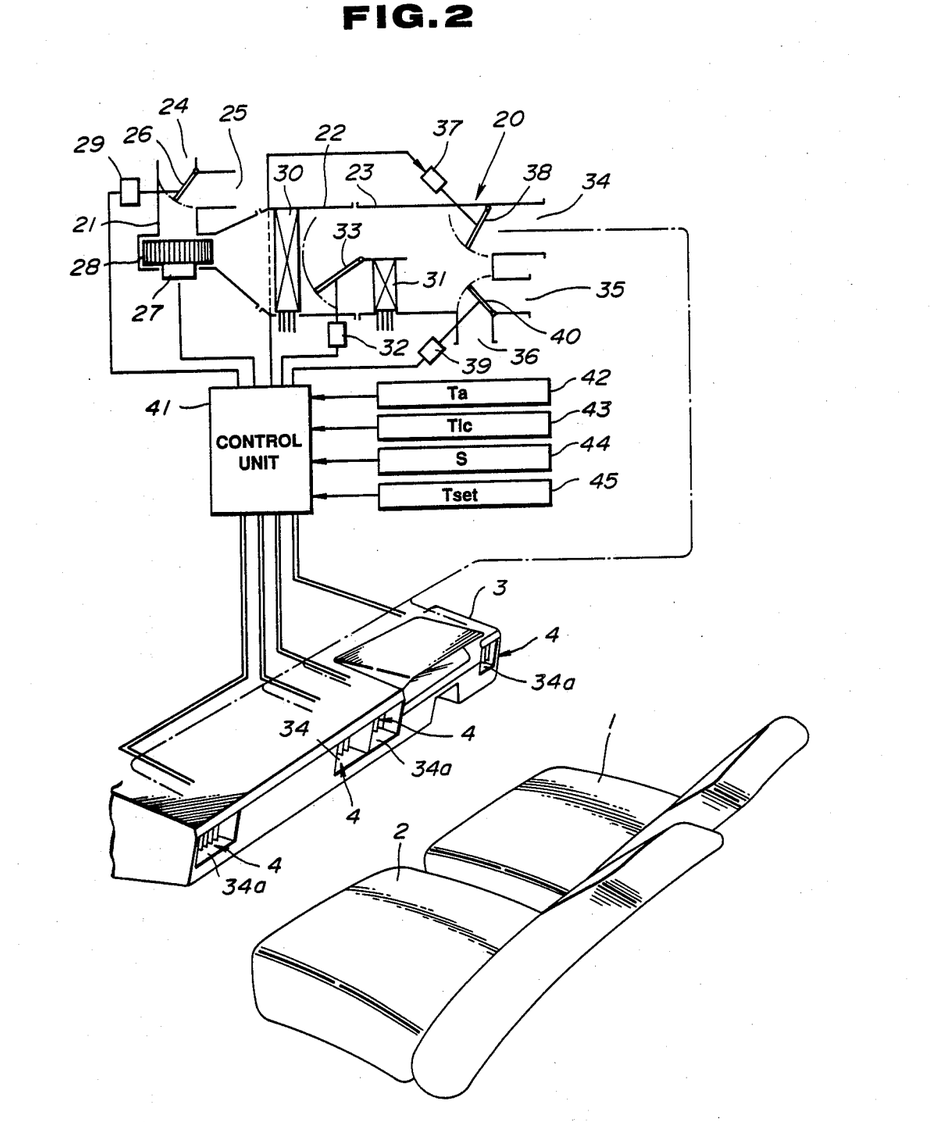
FIG. 2 is a schematic illustration of an air conditioning system in accordance with the present invention.

FIG. 2, illustrates an air conditioning system embodying the invention. The air conditioning system is intended for use with an automotive vehicle having a liquid-cooled internal combustion engine. A series connection of first, second and third ducts 21, 22 and 23 constitutes an air duct through which air is directed into the passenger compartment. The first duct 21 has a first inlet port 26 opening onto the atmosphere and a second inlet port 25 opening onto the passenger compartment. An air intake valve 26 can move between two positions. In the first position, the air intake valve 26 closes the first inlet port 24 and opens the second inlet port 25. When the air intake valve 26 is in the second position, it opens the first inlet port 24 and closes the second inlet port 25. An air intake valve actuator 29 is operated on command by a control unit 41 to move the air intake valve 26 between the first and second positions. The first duct 21 contains a blower unit which includes a blower 28 and a blower motor 27. The blower motor 27 is operated on command by the control unit 41 for driving the blower 28 so as to produce a forced flow of air through the air duct.

The air conditioning system also includes an air chilling heat exchanger in the form of an evaporator 30 disposed in the second duct 22, and an air heating heat exchanger in the form of a heater core 31 disposed in the third duct 23. Air flowing through the air duct is chilled by the evaporator 30 after which the air may be reheated to a desired degree as it passes through the heater core 31 which carries a controlled amount of engine coolant from the engine cooling system. An air mixing valve 33 is provided on the upstream side of the heater core 31 for controlling the air flow to the heater core 31. The air mixing valve 33 is adjustably movable to proportion the chilled air across the heater core 31 to control the final temperature of the air entering the passenger compartment. An air mixing valve actuator 32 is operated on command by the control unit 41 to move the air mixing valve 33 to a desired angle.

The third duct 23 has a ventilator port 34, a defroster port 35, and a lower port 36. The ventilator port 34 is connected to a plurality of exit openings 34a formed in the vehicle instrument panel. These exit openings 34a face the passengers (not shown) seated on the front seats 1 and 2. A louver window 4 is provided for each of the exit openings 34a. The defroster port 35 opens to defog the vehicle windshield under a specified condition. The lower port 36 opens onto the passenger compartment to direct the conditioned air along the floor of the compartment. A vent valve 38 can move between two positions. In the first position, the vent valve 38 closes the ventilator port 34. When the vent value 38 is in the second position, it opens the ventilator port 34. A vent valve actuator 37 is operated on command by the control unit 41 to move the vent valve 38 between the first and second positions. A change-over valve 40 can move between two positions. In the first position, the change-over valve 40 closes the defroster port 35 and opens the lower port 36. When the change-over valve 40 is in the second position, it opens the defroster port 35 and closes the lower port 36. A change-over valve actuator 39 is operated on command from the control unit 41 to move the change-over valve 40 between the first and second positions.

Figure 3:
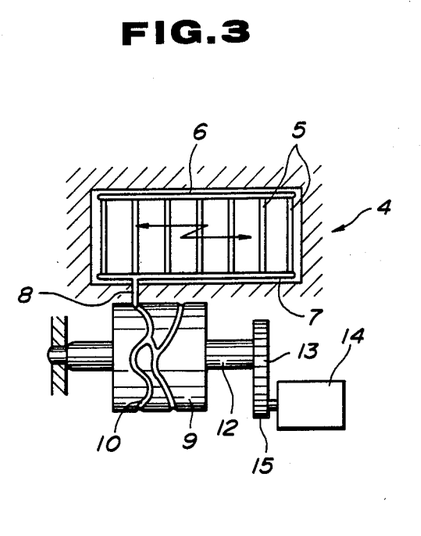
FIG. 3 is an enlarged cross sectional elevation showing the control device used in the air conditioning system of FIG. 2.

As shown in FIG. 3, the louver window 4 has a plurality of swingable louvers 5 which are spaced from one another in the horizontal direction. The louvers 5 are connected by upper and lower links 6 and 7. The lower link 7 has a guide pin 8 held in engagement with a guide groove 10 formed in the peripheral surface of a drum 9. The drum 9 is mounted on a rotary shaft 12 for rotation in unison therewith. A gear 13, which is secured to the rotary shaft 12, is held in engagement with a gear 13 secured to the output shaft of a drive motor 14. When the air conditioning system is required to operate in a concentrated mode in which it discharges the conditioned air in the form of concentrated currents toward the passengers, the drive motor 14 is operated on command by the control unit 41 to place the louver window 4 at a position concentrating the conditioned air at the passengers seated on the front seats 1 and 2. In the illustrated example, the conditioned air is directed toward the passenger seated on the right front seat 1 through the right two exit openings 34a and toward the passenger seated on the left front seat 2 through the left two exit openings 34a. When the air conditioning system is required to operate in a diffusion mode in which is discharges the conditioned air in the form of diffused currents toward the passengers, the motor 14 is operated on command by the control unit 41 to rotate the drum 9. As a result, the guide pin 8 slides in the guide groove 10, causing simultaneous swinging movement of the louvers 5 so as to produce pulsated air currents diffusing in the passenger compartment. It is to be noted that the motor 14 may be operated to place the louver window 4 in a position deviated outwardly from the position required for the concentration mode so that the conditioned air is discharged in the form of diffused currents toward the passengers. Alternatively, one of the exit openings 34a through which the conditioned air is discharged toward the corresponding passenger may be closed when the air conditioning system is required to operate in a diffusion mode.

The control unit 41 controls the air conditioning system by controlling the drive motor 14, the blower motor 27, the air intake valve actuator 29, the air mixing valve actuator 32, the vent valve actuator 37 and the change-over valve actuator 39 based upon various conditions that are sensed during the operation of the air conditioning system. These sensed conditions include the ambient temperature, compartment temperature, and insolation intensity. Thus, an ambient temperature sensor 42, a compartment temperature sensor 43, and an insolation intensity sensor 44 are connected to the control unit 41. The ambient temperature sensor 42 is sensitive to ambient temperature and it produces an ambient temperature signal indicative of the sensed ambient temperature Ta. The compartment temperature sensor 43 is sensitive to compartment temperature and it produces a compartment temperature signal indicative of a sensed compartment temperature Tic. The insolation intensity sensor 44 is sensitive to insolation intensity and it produces an insolation intensity signal indicateve of a sensed insolation intensity S. A compartment temperature setting device 45 is also connected to the control unit 41. The setting device 45 is mounted on the vehicle instrument panel at a convenient position for the passenger to set a desired value Tset for compartment temperature.

The control unit 41 may employ a digital computer which shall be regarded as including an analog-to-digital converter, a central processing unit, a memory, a digital-to-analog converter, and output control circuits. The analog-to digital converter receives the analog signals from the sensors 42, 43 and 44 and also from the compartment temperature setting device 45 and it converts the received signals into corresponding digital signals for application to the central processing unit. The memory contains the program for operating the central processing unit and further contains appropriate data in look-up tables used in calculating appropriate values for blower motor driving voltage. Control words specifying desired motor driving voltage and desired air mixing valve position are periodically transferred by the central processing unit to the digital-to-analog converter. The digital-to-analog converter converts the transferred information into analog form and it applies a blower motor driving voltage for controlling the blower motor 27 and a control signal to the air mixing valve actuator 32 for controlling the degree of opening of the air mixing valve 33. The control circuits produce various commands, as directed by the central processing unit based on the sensed conditions, for controlling the drive motor 14 and the valve actuators 29, 37 and 39.

Figure 4:
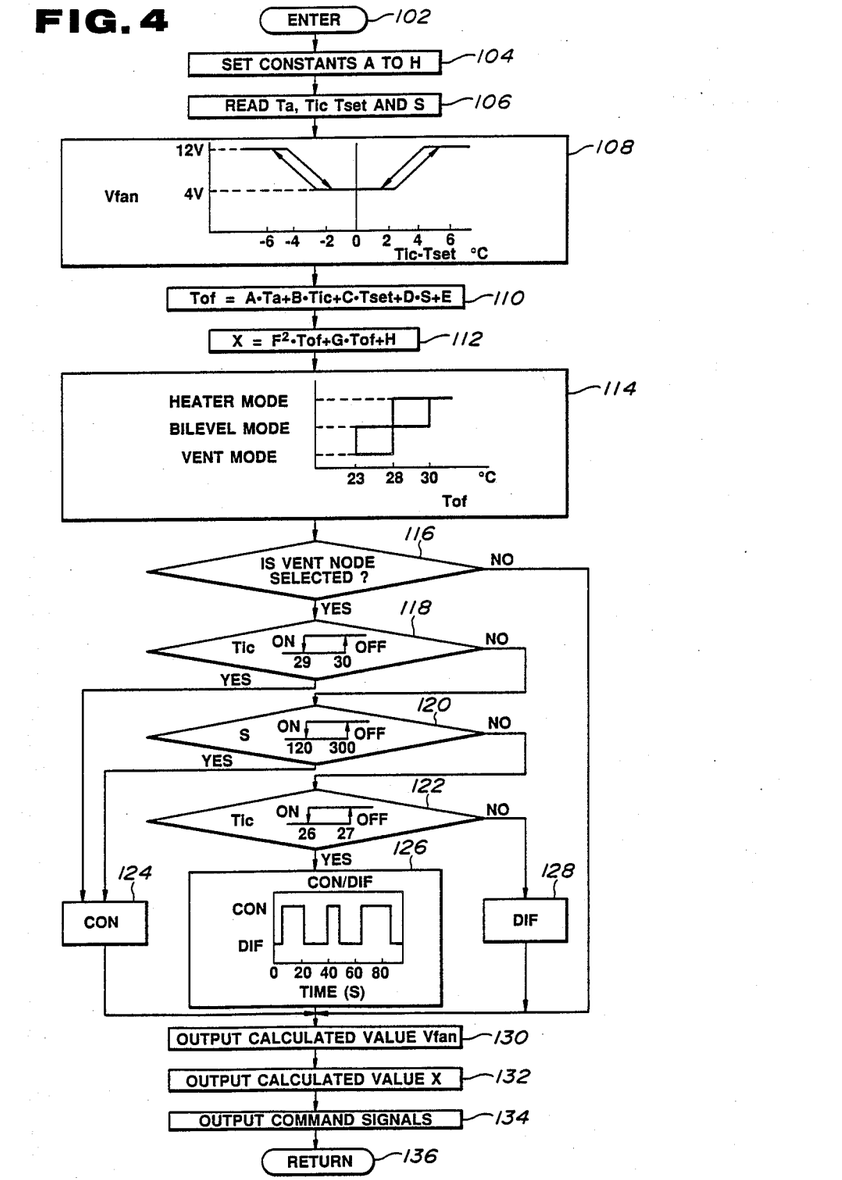
FIG. 4 is a flow diagram of the programming of the digital computer used in the air conditioning system of FIG. 2.

FIG. 4 is a flow diagram of a program performed by the digital computer used in the control unit 41 for controlling the air conditioning system. The computer program is entered at step 102 when the air conditioning system is turned on. In step 104 of the program, the central processing unit sets various constants A to H for use in calculating a required value Tof for the conditioned air temperature and a required value for air mixing valve position. Following this, the ambient temperature signal, the compartment temperature signal, the insolation intensity signal, and the compartment temperature setting signal are, one by one, converted by the analog-to-digital converter into digital form and read into the computer memory in step 108.

In step 108 in the program, the central processing unit calculates a required valve Vfan for the blower motor driving voltage from a relationship programmed into the computer. This relationship, shown in step 108, defines blower motor driving voltage as a function of a difference (Tic−Tset) where Tic is the compartment temperature value, and Test is the compartment temperature setting value.

In step 110 in the program, the central processing unit calculates a required value Tof for conditioned air temperature from the following equation:

$$Tof = A.Ta + B.Tic + C.Tset + D.S + E$$

where Ta is the ambient temperature value, Tic is the compartment temperature value, Tset is the compartment temperature setting value, S is the insolation intensity value, and A, B, C, D and E are the constants set in step 104. In step 112 in the program, the central processing unit calculates a required value X for the air mixing door position from the following equation:

$$X = F^2.Tof + G.Tof + H$$

where Tof is the calculated conditioned air temperature value, and F, G and H are constants set in step 104.

In step 114 in the program, the central processing unit selects one of "heater", "bilevel" and "vent" modes. This selection is based on the calculated value Tof of conditioned air temperature, as shown in the step 114. In step 116 in the program, a determination is made as to whether or not the "vent" mode is selected. If the answer to this question is "yes", then the program proceeds to step 118. Otherwise, the program proceeds to step 130.

In step 118 in the program, a determination is made as to whether or not the compartment temperature exceeds a first reference value. For this determination, the central processing unit may compare the compartment temperature value Tic with a lower reference level (for example, 29° C.) when the compartment temperature is decreasing and with a higher reference level (for example, 30° C.) when the compartment temperature is increasing. This is effective to eliminate the tendency toward hunting. If the answer to this question is "yes", then it means that the compartment temperature value Tic is greater than the lower reference level when the compartment temperature is decreasing or the compartment temperature value Tic is greater than the higher reference level when the compartment temperature is increasing and the program proceeds to step 124. Otherwise, the program proceeds to perform another determination in step 120. This determination is as to whether or not the insolation intensity S exceeds a second reference level. For this determination, the central processing unit may compare the insolation intensity value S with a lower reference level (for example, 120 kcal/m²h) when the insolation intensity is decreasing and with a higher reference level (for example, 300 kcal/m²h) when the insolation intensity is increasing. This is effective to eliminate the tendency toward hunting. If the answer to this question is "yes", then it means that the insolation intensity value S is greater than the lower reference level when the insolation intensity is decreasing or the insolation intensity value S is greater than the higher reference level when the insolation intensity is increasing and the program proceeds to the point 124. Otherwise, the program proceeds to perform another determination in step 122. This determination is as to whether or not the compartment temperature Tic exceeds a third reference level less than the first reference level. For this determination, the central processing unit may compare the compartment temperature value Tic with a lower reference level (for example, 26°

C.) when the compartment temperature is decreasing and with a higher reference level (for example, 27° C.) when the compartment temperature is decreasing. This is effective to eliminate the tendency toward hunting. If the answer to this question is "yes", then it means that the compartment temperature value Tic is greater than the lower reference level when the compartment temperature is decreasing or the compartment temperature value Tic is greater than the higher reference level when the compartment temperature is increasing and the program proceeds to step 126. Otherwise, the program proceeds to step 128.

In step 124 in the program, the central processing unit selects the "concentration" mode and produces a command signal to operate the drive motor 14 so as to place the louver window 4 at positions discharging the tempered air in the form of concentrated current toward the passengers. In step 128, the central processing unit selects the "diffusion" mode and produces a command signal to operate the drive motor 14 so as to move the louver windows 4 in such a manner to discharge the tempered air in the form of diffused currents toward the passengers. In step 126, the central processing unit selects the "concentration/diffusion" mode and produces a command signal to operate the drive motor 14 in a manner to change the "concentration" and "diffusion" modes at variable time intervals, as shown in step 126.

In step 130 in the program, the calculated blower motor driving voltage value Vfan is transferred to the digital-to-analog converter. The digital-to-analog converter converts the transferred information into analog form and applies a blower motor driving voltage for controlling the blower motor 27 according to the calculated value for it. At the point 132 in the program, the calculated air mixing valve position value X is transferred to the digital-to-analog converter. The digital-to-analog converter converts the transferred information into analog form and applies a control signal to the air mixing valve actuator 32 which thereby makes a change in the position of the air mixing valve 33 if this is required.

In step 134 in the program, the central processing unit causes the control circuits to produce command signals to the valve actuators 37 and 39, causing the vent and change-over valves 38 and 40 to open the defroster port 35 and the lower port 36 when the "heater" mode has been selected in step 114, or to open the ventilator port 34 and the lower port 36 when the "bilevel" mode has been selected in step 114, or to open the ventilator port 34 when the "vent" mode has been selected in step 114.

Following this, the program proceeds to step 136 where the computer program returns to step 106 to start the next cycle of execution of the computer program.

In this embodiment, the central processing unit selects one of the "concentration", "diffusion" and "concentration/diffusion" modes from the results of the determinations made in steps 118, 120 and 122. This mode selection is made as shown in Table 1 where the mark O indicates that the corresponding condition is fulfilled and the mark X indicates that the corresponding condition is not fulfilled.

TABLE 1

| Case No. | Tic > 29 | Tic > 26 | S > 120 | Mode |
|---|---|---|---|---|
| 1 | O | O | O | CON |
| 2 | O | O | X | CON |
| 3 | X | O | O | CON |
| 4 | X | O | X | DIF |

TABLE 1-continued

| Case No. | Tic > 29 | Tic > 26 | S > 120 | Mode |
|---|---|---|---|---|
| 5 | X | X | O | CON/DIF |
| 6 | X | X | X | DIF |

As can be seen from a study of Table 1, different modes are selected depending on the insolation intensity at the same compartment temperature. For example, although the conditions related to the compartment temperature Tic are the same for Cases Nos. 3 and 4, the central processing unit selects the "concentration" mode for Case No. 3 where the insolation intensity S is greater than 120 kcal/m²h and the "diffusion" mode for Case No. 4 where the insolation intensity S is smaller than 120 kcal/m²h. In other words, the mode selection depends on not only the compartment temperature but also the insolation intensity. Therefore, it is possible to produce conditioned air flows in the passenger compartment in a manner so as to meet the bodily sensation of the passengers.

Figure 5:
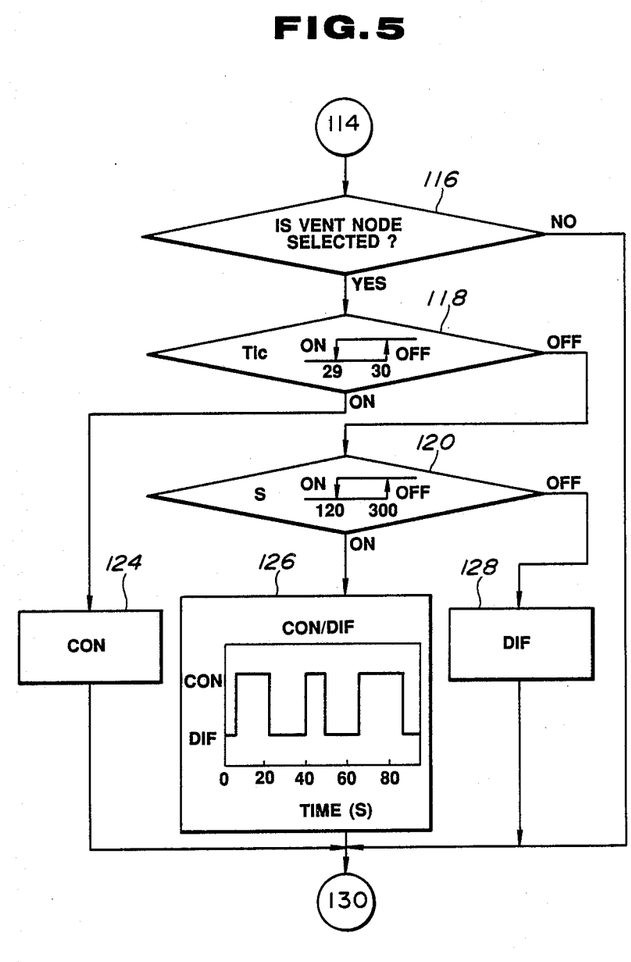
FIG. 5 is a flow diagram showing a modified form of the programming of FIG. 4.

FIG. 5 is a flow diagram showing a modified form of the programming of the digital computer used in the control unit 41 for controlling the air conditioning system. This program is substantially the same as the program of FIG. 4 except that step 122 is eliminated. In this modification, the program proceeds directly to step 128 if the answer to the question input in step 120 is "no". Otherwise, the program proceeds from step 120 to step 126.

TABLE 2

| Case No. | Tic > 29 | S > 120 | Mode |
|---|---|---|---|
| 1 | O | O | CON |
| 2 | O | X | CON |
| 3 | X | O | CON/DIF |
| 4 | X | X | DIF |

In this modification, the central processing unit selects one of the "concentration", "diffusion" and "concentration/diffusion" modes from the results of the determinations made in steps 118 and 120. This mode selection is made as shown in Table 2 where the mark O indicates that the corresponding condition is fulfilled and the mark X indicates that the corresponding condition is not fulfilled.

As can be seen by reference to Table 2, different modes are selected depending on the insolation intensity at the same compartment temperature. For example, although the conditions related to the compartment temperature Tic are the same for Cases Nos. 3 and 4, the central processing unit selects the "concentration/diffusion" mode for Case No. 3 where the insolation intensity S is greater than 120 kcal/m²h and the "diffusion" mode for Case No. 4 where the insolation intensity S is smaller than 120 kcal/m²h. In other words, the mode selection depends on not only the compartment temperature but also the insolation intensity. Therefore, it is possible to produce tempered air flow in the passenger compartment in a manner so as to match the bodily sensation of the passengers.

As described above, the present invention provides an improved air conditioning system where the "concentration" mode is selected until the compartment temperature reaches at a reference level after which the "diffusion" or "concentration/diffusion" mode is selected according to the existing insolation intensity.

Therefore, it is possible to eliminate the difficulties of conventional air conditioning systems.

What is claimed is:

1. An automotive air conditioning system including a duct through which conditioned air is directed into a compartment for passengers comprising:

a control device associated with the duct for operating in a first mode discharging the conditioned air in the form of concentrated currents toward the passengers, in a second mode discharging the conditioned air in the form of diffused currents toward the passengers, and in a third mode in which switching is performed between the first and second modes at variable time intervals;

means sensitive to a temperature in the passenger compartment for producing a first sensor signal indicative of the sensed compartment temperature;

means sensitive to the intensity of insolation in the compartment for producing a second sensor signal indicative of the sensed insolation intensity; and a control unit responsive to the first and second sensor signals for operating the control device in one of the first, second and third modes, the control unit including means for operating the control device in the third mode when the sensed compartment temperature is less than a reference value and when the sensed insolation intensity exceeds a reference value.

2. An automotive air conditioning system including a duct through which conditioned air is directed into a compartment for passengers comprising:

a control device associated with the duct for operating in a first mode discharging the conditioned air in the form of concentrated currents toward the passengers, in a second mode discharging the conditioned air in the form of diffused currents toward the passengers, and in a third mode in which switching is performed between the first and second modes at variable time intervals;

means sensitive to a temperature in the passenger compartment for producing a first sensor signal indicative of the sensed compartment temperature;

means sensitive to the intensity of insolation in the compartment for producing a second sensor signal indicative of the sensed insolation intensity; and a control unit responsive to the first and second sensor signals for operating the control device in one of the first, second and third modes, the control unit including means for producing a first control signal when the sensed compartment temperature exceeds a first reference value and a second control signal when the sensed compartment temperature is less than the first reference value, means responsive to the second control signal for producing a third control signal when the sensed insolation intensity is less than a second reference value and a fourth control signal when the sensed insolation intensity exceeds the second reference value, means responsive to the first control signal for operating the control device in the first mode, means responsive to the third control signal for operating the control device in the second mode, and means responsive to the fourth control signal for operating the control device in the third mode.

3. The air conditioning system as claimed in claim 2 wherein the control unit includes means for comparing the sensed compartment temperature with a first predetermined value when the compartment temperature is increasing and with a second predetermined value which is less than the first predetermined value when the compartment temperature is decreasing, means for producing the first signal when the sensed compartment temperature exceeds the first predetermined value or when the sensed compartment temperature exceeds the second predetermined value, and means for producing the second control signal when the sensed compartment temperature is less than the first predetermined value or when the sensed compartment temperature is less than the second predetermined value.

4. The air conditioning system as claimed in claim 3 wherein the control unit includes means for comparing the sensed insolation intensity with a third predetermined value when the insolation intensity is increasing and with a fourth predetermined value which is less than the third predetermined value when the insolation intensity is decreasing, means responsive to the second signal for producing the third control signal when the sensed insolation intensity is less than the third predetermined value or when the sensed insolation intensity is less than the fourth predetermined value, and means responsive to the second control signal for producing the fourth control signal when the sensed insolation intensity exceeds the third predetermined value or when the sensed insolation intensity exceeds the fourth predetermined value.

5. An automotive air conditioning system including a duct through which conditioned air is directed into a compartment for passengers comprising:

a control device associated with the duct for operating in a first mode discharging the conditioned air in the form of concentrated currents toward the passengers, in a second mode discharging the conditioned air in the form of diffused currents toward the passengers, and in a third mode in which switching is performed between the first and second modes at variable time intervals;

means sensitive to a temperature in the passenger compartment for producing a first sensor signal indicative of the sensed compartment temperature;

means sensitive to the intensity of insolation in the compartment for producing a second sensor signal indicative of the sensed insolation intensity; and a control unit responsive to the first and second sensor signals for operating the control device in one of the first, second and third modes, the control unit including means for producing a first control signal when the sensed compartment temperature exceeds a first reference value and a second control signal when the sensed compartment temperature is less than the first reference value, means responsive to the second control signal for producing a third control signal when the sensed insolation intensity is less than a second reference value and a fourth control signal when the sensed insolation intensity exceeds the second reference value, means responsive to the third control signal for producing a fifth control signal when the sensed compartment temperature is less than a third reference value which is less than the first reference value and a sixth control signal when the sensed compartment temperature exceeds the third reference value, means responsive to the first or fourth control signal for operating the control device in the first mode, means responsive to the fifth control signal for operating the control device in the second mode, and means responsive to the sixth control signal for operating the control device in the third mode.

6. The air conditioning system as claimed in claim 5 wherein the control unit includes means for comparing the sensed compartment temperature with a first predetermined value when the compartment temperature is increasing and with a second predetermined value which is less than the first predetermined value when the compartment temperature is decreasing, means for producing the first signal when the sensed compartment temperature exceeds the first predetermined value or when the sensed compartment temperature exceeds the second predetermined value, and means for producing the second control signal when the sensed compartment temperature is less than the first predetermined value or when the sensed compartment temperature is less than the second predetermined value.

7. The air conditioning system as claimed in claim 6 wherein the control unit includes means for comparing the sensed insolation intensity with a third predetermined value when the insolation intensity is increasing and with a fourth predetermined value which is less than the third predetermined value when the insolation intensity is decreasing, means responsive to the second signal for producing the third control signal when the sensed insolation intensity is less than the third predetermined value or when the sensed insolation intensity is less than the fourth predetermined value, and means responsive to the second control signal for producing the fourth control signal when the sensed insolation intensity exceeds the third predetermined value or when the sensed insolation intensity exceeds the fourth predetermined value.

8. The air conditioning system as claimed in claim 7 wherein the control unit includes means for comparing the sensed compartment temperature with a fifth predetermined value which is less than the second predetermined value when the compartment temperature is increasing and with a sixth predetermined value which is less than the fifth predetermined value when the compartment temperature is decreasing, means responsive to the third control signal for producing the fifth control signal when the sensed compartment temperature is less than the fifth predetermined value or when the sensed compartment temperature is less than the sixth predetermined value, and means responsive to the third control signal for producing the sixth control signal when the sensed compartment temperature exceeds the fifth predetermined value or when the sensed compartment temperature exceeds the sixth predetermined value.

* * * * *